United States Patent [19]

Blum et al.

[11] Patent Number: 4,654,727
[45] Date of Patent: Mar. 31, 1987

[54] VIDEOCASSETTE HANDLING AND SEQUENCING SYSTEM

[75] Inventors: Victor Blum; Timothy L. Crabtree, both of Anaheim; Robert G. Fairchild, Santa Ana, all of Calif.

[73] Assignee: Odetics, Inc., Anaheim, Calif.

[21] Appl. No.: 720,591

[22] Filed: Apr. 8, 1985

[51] Int. Cl.⁴ ............................................. G11B 15/68
[52] U.S. Cl. ...................................................... 360/71
[58] Field of Search ............................................ 360/71

[56]         References Cited
      U.S. PATENT DOCUMENTS 3,831,197  8/1974  Beach et al. ............................ 360/71
4,271,440  6/1981  Jenkins et al. .......................... 360/92
4,475,222  10/1984 Egendorf .................................. 360/93

Primary Examiner—George G. Stellar
Attorney, Agent, or Firm—Spensley Horn Jubas & Lubitz

[57]                   ABSTRACT

A tape cassette handling and sequencing system includes a large storage library having a plurality of storage bins and a cassette loading section for receiving cassettes to be stored in the storage bins. Tape transports are provided for playing cassettes stored in the library. A manipulator assembly moves cassettes between the loading section, storage bins and tape transports. The design facilitates the automatic sequencing of a large number of cassettes thus freeing an operator for other tasks.

11 Claims, 5 Drawing Figures

U.S. Patent    Mar. 31, 1987    Sheet 1 of 3    4,654,727
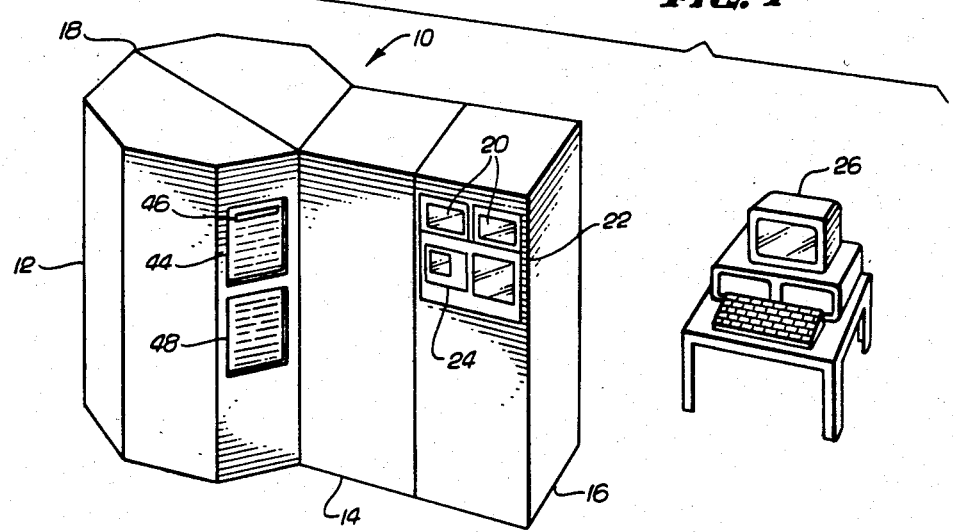
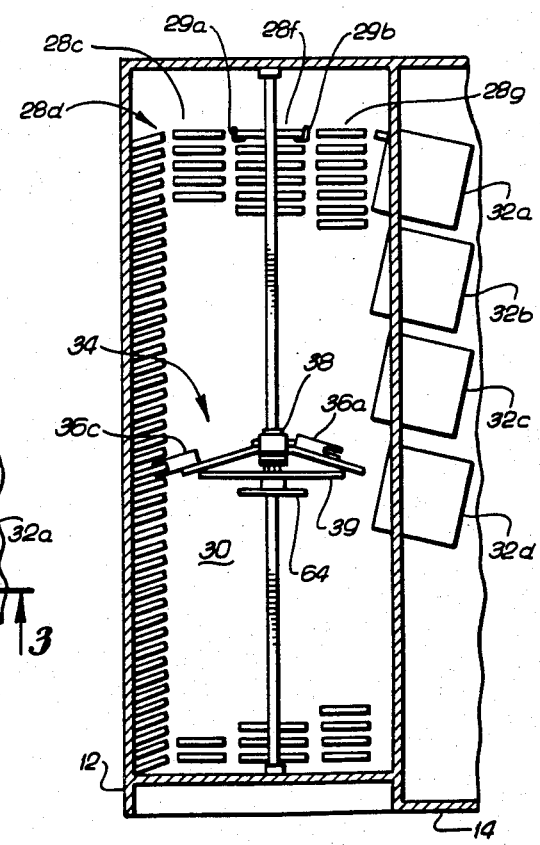
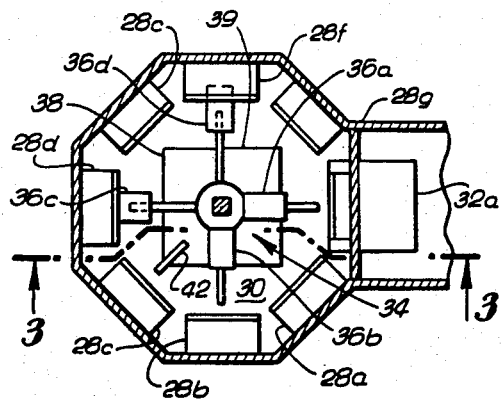

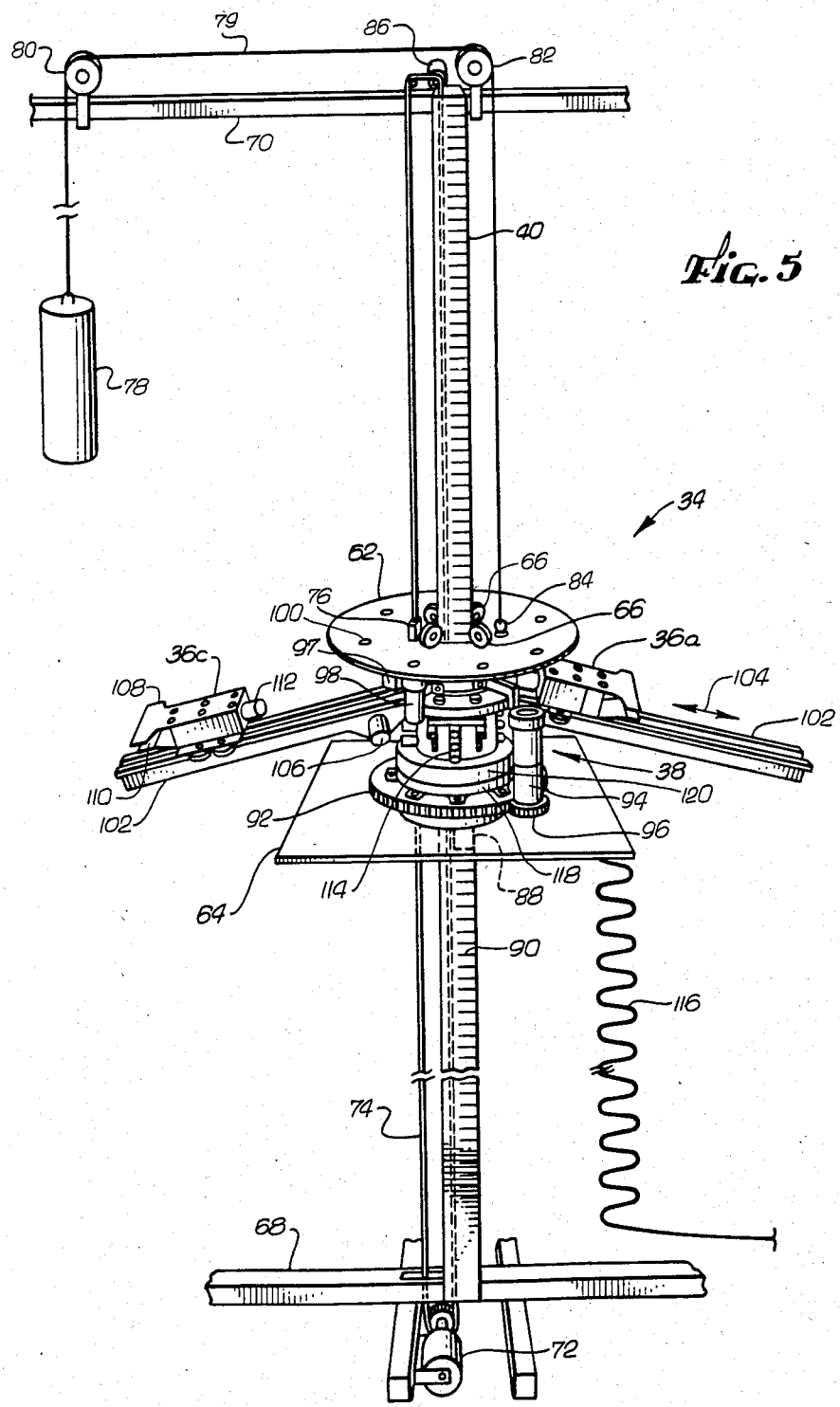

VIDEOCASSETTE HANDLING AND SEQUENCING SYSTEM

BACKGROUND OF THE INVENTION

1. Field of the Invention

The present invention relates to an automatic handling and sequencing system for controlling the playback of tape cassettes, and more particularly videotape cassettes. In television broadcasting, a number of short video messages, or "spots", are often shown in sequence, e.g., during commercial breaks. Multiple videotape playback machines are employed to play these spots. After each spot, a machine must be loaded with a new cassette for playback later during the same break or in a subsequent break. The loading and unloading of the tape playback machines thus requires almost constant attention.

2. Description of the Prior Art

Automated video spot players have been previously developed. Such players include a plurality of videotape playback machines and some form of tape cartridge or cassette conveyor mechanism for transporting cartridges or cassettes containing video tape to and from the playback machines. In some machines, a number of tape cartridges (generally between fifteen and twenty-five) are carried on a moving carousel which brings the cartridges into position adjacent the desired tape playback unit. Although these systems provide some automation to spot broadcasting, they have the drawback of requiring a custom cartridge for the videotape. In addition, the conveyor system of such systems is relatively complex and expensive to build and maintain.

A more recently developed system incorporates a column of storage bins for standard videocassettes and an elevator mechanism which is employed to access the videocassettes and load transport units which are part of the system. In this system, forty videocassettes are carried in a single column of storage bins. After a cassette is placed in a bin by the operator of the machine, a bar code label on the cassette is read by a bar code reader in order to enable a computer control system to determine the location of the cassette and control the subsequent transport of cassettes to the tape transports. Although this system provides several improvements over previous sequencing systems, it still has several important limitations. Primary among these is the limited capacity of the system. Since only forty cassettes can be placed in the system, a great deal operator attention is still required. A further disadvantage is that the storage bins include mechanisms for aiding in the removal of tapes and preventing the inadvertant operator insertion of tapes into bins from which a cassette has been removed for playback, thereby resulting in a relatively complex machine.

SUMMARY OF THE INVENTION

The present invention is directed to an automatic cassette handling and sequencing system in which operating convenience and capability are vastly superior to prior designs. The system includes a cassette storage library having a plurality of storage bins. In one embodiment of the invention, over three hundred storage bins are provided in a number of columns arranged around a central space, with an additional column of cassette transports also facing the central space. Loading and unloading of the library is greatly simplified by providing a number of access bins into which cassettes to be entered into the library are inserted. The insertion of the cassettes is sensed, and a cassette manipulator mechanism automatically grasps each tape and moves it to a storage bin within the library, where it is stored until subsequent playback. Each cassette has a bar code label which is read upon insertion into the library. Once the cassette is identified in this fashion, its location within the system is continuously tracked. A computer control system controls the storage of cassettes within the library and the sequencing of playback of cassettes. After a cassette has been played, it is either returned to a storage bin or moved to an access area where the operator removes it from the machine.

Storage within the library is accomplished completely under computer control, with the operator only having to enter cassettes into the access bins. The actual storage location of each cassette is then determined by the computer based upon available storage bins in the library. The result is that the system is at least as convenient to operate as prior art systems which hold far fewer cassettes. By providing a system which holds several hundred cassettes, the entire spot programming for one eight hour shift may typically be accomplished in a single procedure, thus freeing the operator for additional tasks within the broadcast station.

BRIEF DESCRIPTION OF THE DRAWINGS

The invention will be described with reference to the accompanying drawings, wherein:

FIG. 1 is a perspective view of the cassette handling system of the present invention;

FIG. 2 is a top plan diagrammatic view of the cassette library and manipulator of the present invention;

FIG. 3 is a sectional view along lines 3—3 of FIG. 2 showing the arrangement of the library and videocassette transport units;

FIG. 5 is a perspective view of the cassette manipulator assembly of the present invention.

DESCRIPTION OF THE PREFERRED EMBODIMENT

Figure 4:
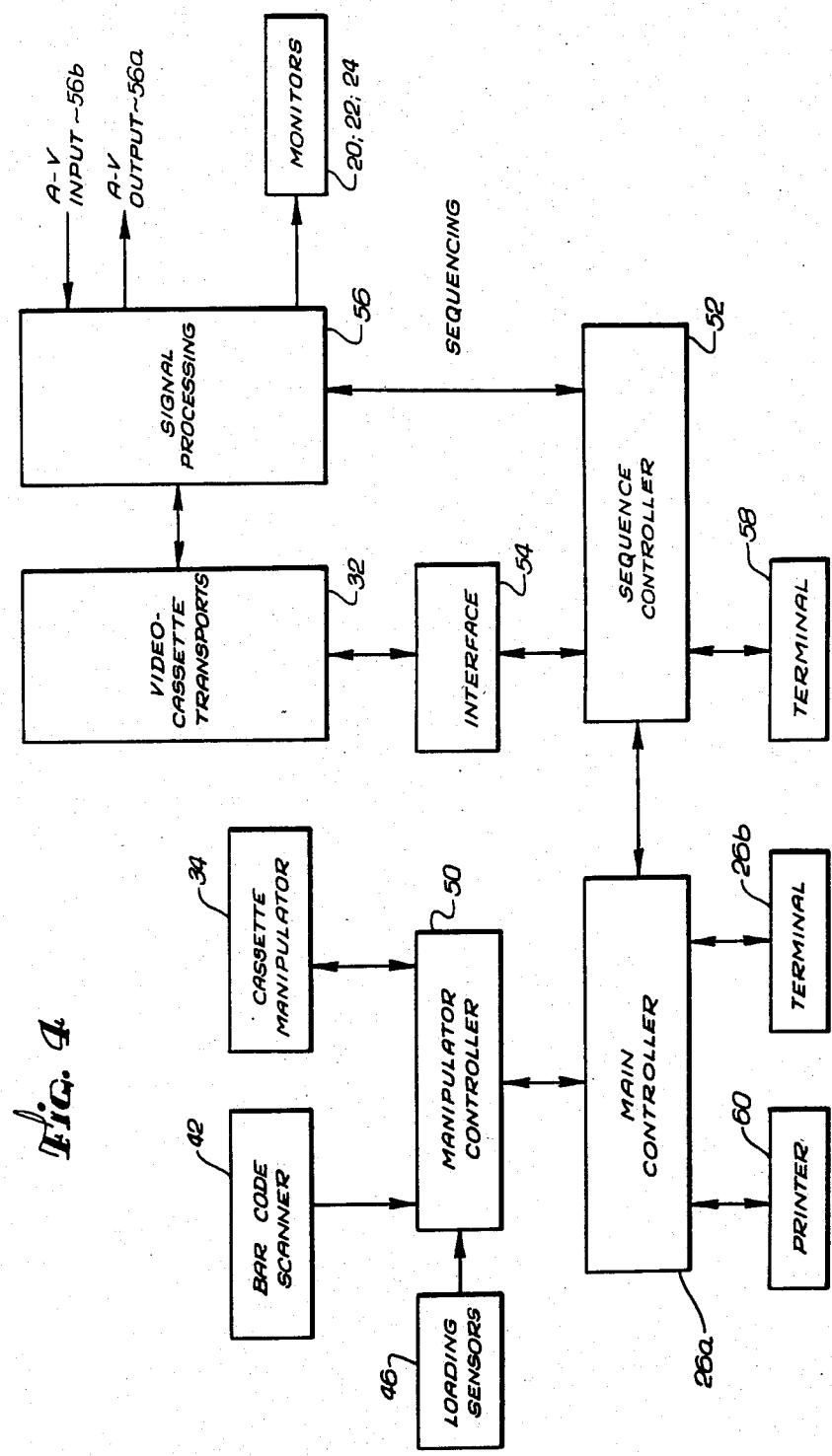
FIG. 4 is a block diagram of the control system of the present invention.

The following description is of the best presently contemplated mode of carrying out the invention. This description is made for the purpose of illustrating the general principles of the invention and is not to be taken in a limiting sense. The scope of the invention is best determined by reference to the appended claims.

Referring to FIG. 1, the present invention is comprised of a main housing 10 including an octagonal library portion 12, a videotape transport and electronics section 14 and a monitoring section 16. The library section is hinged at 18 so as to allow access to its interior for servicing. The library section is configured to store approximately three hundred videocassettes. The electronics section 14 includes a plurality of video cassette transports and associated electronics. The monitoring section 16 includes a pair of stereo speakers 20 for audio monitoring, a video monitor 22 and a waveform monitor/vector scope 24. The operation of the system is controlled by means of a computer 26 which in the present embodiment is a personal computer including a control keyboard and a monitor.

Referring to FIGS. 2 and 3, the configuration of the library section 12 will be described. The library includes seven columns 28a–g of cassette storage bins, with each bin being slightly inclined so as to aid in the retention of videocassettes. Each bin is defined by two L-shaped sections 29a and 29b attached to the housing, as illustrated in FIG. 3. In the present embodiment of the invention, each column includes forty-three individual storage bins, with the library 12 thus containing a total of three hundred and one storage bins. The columns 28a–g are arranged in a circular fashion, with one column being located on each of seven sides of the octagonal housing. The columns thus surround a central space 30.

A column of four videocassette transports 32a–d is located on the eighth side of the library housing. The transports 32 are substantially the same distance from the axial center of the space 30 as are the storage bins 28. The transports 32 and associated electronics may be playback only, or may be record/playback to facilitate dubbing of videocassettes.

A videocassette manipulator assembly 34 is contained within the central space 30, and includes four cassette gripper mechanisms 36a–d carried on a hub assembly 38 and circuit board 39, both of which are rotatable and vertically movable with respect to a central vertical shaft 40 coincident with the longitudinal axis of the central space 30. The gripper mechanisms are spaced at angles which are integral multiples of the angular spacing of the columns of storage bins, so that the gripper mechanisms may operate simultaneously. A bar code reader 42 is also attached to the circuit board assembly 39.

The cassette manipulator assembly 34 transports cassettes between various storage bins and between storage bins and the cassette transport units under control of the computer 26. Cassettes to be entered into the library 12 are inserted via an access port 44 (FIG. 1) which exposes a portion of the column of storage bins 28a. Each of the exposed bins includes an associated cassette sensor for detecting when a cassette is inserted into it, with a sensor 46 for one of the bins being indicated in FIG. 1. The sensor may be a mechanical sensor, optical sensor or other type of sensor which can function to provide a detection signal when a cassette is inserted into a storage bin. Since the bins at the access opening are exposed at their lower side, they are provided with lips for retaining videocassettes inserted into them.

Cassettes to be removed from the system are provided by the manipulator 34 to a second access opening 48 (FIG. 1) located below the opening 44. In normal operation, all cassettes contained in the library will be entered through the access opening 44 and subsequently removed through the access opening 48. With this configuration, the operation of the system is greatly simplified, since there is no requirement of physical access to all the storage bins of the library during normal operation.

FIG. 4 is a block diagram of the handling and sequencing system of the present invention. The system operates to access a series of cassettes from the library, load them into the transports 32 and play them consecutively in a desired order. The cassettes are then returned by the manipulator 34 to storage bins which may be in the main library for storage or adjacent the access opening 48 for cassettes that are to be removed from the library.

The computer 26 includes a main controller 26a and terminal 26b and associated printer 60. The printer 60 is driven by the main controller and automatically provides a "as played" record of events. The main controller provides commands to a manipulator controller 50 and a sequence controller 52. The manipulator controller is a microprocessor-based controller which provides commands to the manipulator 34 and decodes information from the bar code scanner 42 and sensors 46. The sequence controller 52 is also a microprocessor-based system which serves to control the operation of the transport units 32. The sequence controller is responsible for executing a programmed sequence received from the main controller by sending the appropriate commands to a videocassette unit interface 54 and to a signal processing unit 56. A local terminal 58 may be provided for manually entering or changing playback sequence schedules. The interface electronics 54 provides the necessary timing and interface circuitry to allow the sequence controller to control the remote functions of the transport units 32 such as play, stop and rewind operations. The signal processing block 56 contains the necessary switching circuitry to perform switching between the transport units during a sequence. Audio and monitor input switching is also included in this block to provide signals to the monitors 20, 22 and 24. An audio-video output is provided at 56a for broadcasting, and an audio-video input is provided at 56b for dubbing from external sources.

The main controller 26a is programmed to contain data regarding every cassette in general use in the system, e.g., all of the cassettes in general use in a television station. These cassettes are referred to as the "master" library. Each cassette is provided with a bar code label which is read by the bar code scanner 42 after each cassette has been placed in the library 12 and is moved to a storage bin. The bar code includes a unique cassette identification number for each cassette. As a cassette is entered into the library 12 via the access opening 44, a loading sensor 46 associated with the storage bin into which the cassette is loaded provides a detection signal to the manipulator controller 50. The controller 50 automatically actuates the cassette manipulator 34 to move the cassette from the loading bin to a storage bin within the library 12. Prior to the grasping of the cassette by the manipulator, the bar code on the cassette is read by means of the bar code scanner 42. The scanned code is decoded by the manipulator controller 50 and provided to the main controller 26a. The controller 26a in turn instructs the manipulator controller 50 to cause the cassette manipulator 34 to deposit the cassette in a selected storage bin. The main controller 26a maintains a cross reference of each cassette (based upon the scanned bar code) with a storage location within the library 12.

In operation, the main controller 26a may be programmed by providing it with a time sequential list (log) of cassettes to be played. The cassettes may be identified directly by the identification number corresponding to the bar code or by other data relating to the cassette which may be cross-referenced to the identification code in order to locate the cassette. Once the program log has been entered, the required cassette identification numbers are compared by the controller 26a against the cassette data base to determine which of the cassettes are already contained in the library 12. A list is then generated (either on a monitor of the computer 26 or by means of a printer) to indicate what cassettes must be entered into the system. For example, a play list for an eight hour shift may be generated and all of the cassettes required for that shift will be loaded into the library 12 via the access opening 44 prior to the beginning of the shift. Since each cassette is scanned by the bar code reader when it is loaded and is cross referenced to the storage location to which it is delivered, the main controller 26a will contain data regarding the location of every cassette in the library 12.

In executing the play list, the main controller 26a will send commands both to the manipulator controller 50 and the sequence controller 52 based upon the play list and the time of day. For example, in preparation for a station break the main controller 26a will command the manipulator controller 50 to load the first four cassettes into the transport units 32 and command the sequence controller 52 to play the cassettes in the desired order. Once this preliminary set up is complete, and the time is within a specified window of the scheduled start time of the break, the sequence controller 52 is readied to accept an external cue to begin the break.

As the break progresses, the main controller 26a continuously monitors the status of the sequence controller 52. When additional cassettes are required the appropriate commands are sent to the manipulator controller 50 and when additional sequences are required the appropriate commands are sent to the sequence controller 52. In this fashion, the main controller 26a maintains the current state of the machine by ensuring that both the cassette library and the transport units 32 are loaded with the required cassettes and the sequence controller 52 is programmed with the next required sequence.

An important feature of the present invention is the provision of a data base within the main controller 26a corresponding to the entire master library. The bar code on each cassette need only contain an identification number for the purpose of cross referencing the cassette with data corresponding to it. The data base may contain static information such as the title of the cassette, the length of the program on the cassette and the date the cassette was dubbed. In addition to this static information, the provision of the data base within the main controller enables the maintenance of information which may be updated as the cassette is played. Such information includes, for example, the total number of plays of the cassette and the last use of the cassette. The ability to automatically keep records of use as the cassettes are played can be extremely beneficial. For example, it may be desirable to purge all cassettes in the master library which have been played more than a certain number of times. Other applications are possible, with the fundamental aspect being that the provision of the internal data base enables automatic updating of information relating to all cassettes in the master library.

The operation of the sequence controller 52 and associated components will not be described in detail, as the specific operation does not form a part of the invention. One of ordinary skill in the art could develop various methods for achieving the desired sequencing control for the transport units 32. In addition, the programming of the main controller 26a and manipulator controller 50 will not be described in detail, since, given the desired functions, one of ordinary skill in the art could devise the necessary programming without undue experimentation.

FIG. 5 is a detailed illustration of the manipulator assembly 34. The manipulator assembly per se does not form a part of the present invention, but will be described generally to aid in the understanding of the invention. The assembly is described in further detail in U.S. Pat. application Ser. No. 06/720,577 filed concurrently with this application.

For purposes of clarity, the gripper 36b, circuit board assembly 39 and bar code reader 42 have been omitted from FIG. 5. The assembly 34 includes the rotatable hub assembly 38 to which the gripper assemblies are attached, a stationary circular top plate 62 and a stationary lower circuit board 64 which contains a portion of the manipulator controller electronics 50. Additional portions of the manipulator electronics are contained within the library housing 12 and on the circuit board 39. Four V-groove roller bearings 66 are rotatably secured to the top plate 62 and contact the corners of the central support shaft 40. Similarly, four V-groove rollers (not shown) are secured to the underside of the plate 64. The entire assembly 34 is vertically movable along the shaft 40 to position the grippers 36 adjacent desired storage bins.

The shaft 40 is supported at its base by a cross member 68 which forms a portion of the main frame of the library 12. Similarly, the top of the shaft is secured to a cross member 70. A stepper motor 72 secured below the member 68 is used to vertically drive the assembly 34 via a belt 74 which is secured to the circular plate 62 at 76. The belt 74 is formed into a loop and passes through the center of the shaft 40. A counterweight 78 is provided to counteract the weight of the assembly 34 so that the stepper motor 72 need only overcome the mass of the assembly 34 during vertical movement. The weight 78 is attached to a cable 79 which is looped over pulleys 80 and 82 and secured to the plate 62 at a ring 84.

The vertical position of the manipulator assembly 34 is controlled by means of a dual position feedback servo system. Coarse positional feedback is provided by a potentiometer 86 driven by the cable 74, while fine positioning is achieved by employing an optical sensor 88 secured to the underside of the board 64 which senses markings 90 on the shaft 40.

A sprocket 92 forms a part of the non-rotating bearing assembly. A drive motor 94 is secured to the rotating portion of the assembly and drives a gear 96 which engages the sprocket 92. (The large circuit board 39 is secured to the rotating portion of the assembly slightly above the sprocket 92, and the motor 94 and gear 96 pass through an opening in the board.) An optical sensor 97 senses marks on the bottom of the plate 62 to provide feedback for controlling the rotational position of the manipulator assembly. The assembly is to be stopped in fixed positions so as to accurately locate the gripper assemblies 36 with respect to the storage bins of the library and the tape playback units. A solenoid plunger assembly 98 includes a plunger which engages holes 100 in the plate 62 to precisely fix the assembly in the desired rotational position.

The cassette gripper assemblies 36 are slidable along support rails 102 in a direction indicated by an arrow 104. The grippers are driven by means of a D.C. motor attached to each rail 102, with a motor 106 being indicated in FIG. 5. The motors drive timing belts (not shown) which are coupled to the gripper assemblies 36. Each gripper assembly includes an upper lip 108 and a lower flat spring portion 110. The spring portion is driven to an open or closed position by means of a cam (not shown) which is rotated by a motor 112.

Power is transmitted to the motors on the manipulator assembly by means of a slip ring configuration illustrated generally at 114. Power signals and data signals from the portion of the manipulator controller contained in the library housing 12 are coupled via a flexible cable 116 attached to the board 64. Data signals from the cable 116 are converted to infrared signals and are transmitted from the stationary section to the rotating section within a chamber formed by facing cylindrical elements 118 and 120.

In operation, the vertical and rotational motion of the manipulator assembly and the sliding and gripping operation of the gripper assemblies is controlled to move cassettes between desired locations. For example, if the gripper 36c is to transfer a cassette from a storage bin to one of the tape transports, the gripper is moved to a retracted position toward the shaft 40 and the manipulator assembly is driven vertically and rotationally to position the gripper adjacent the desired storage bin. The gripper is then slid forward along the rail 102 to engage the cassette in the storage bin. The spring 110 is then actuated to grasp the cassette between it and the top plate 108. The gripper assembly is then slid back along the shaft 102 with the cassette firmly grasped. The manipulator assembly is then moved vertically and rotationally to position the gripper 36d in front of the desired tape transport unit. At that point, the gripper 36d is moved forward and the spring 110 released so as to load the cassette into the tape player.

Since four arms are provided on the manipulator assembly, more than one cassette may be moved at a time. Furthermore, a cassette may be held by one gripper while another is being removed from a transport by a second gripper. The first cassette may then be quickly inserted into the transport without first having to store the just removed cassette. Also, the operational speed of the system is enhanced, since the average distance to any location to be accessed is reduced. In addition, the provision of four arms provides a redundancy in the event of malfunction of any of the gripper assemblies.

In summary, the present invention provides an improved cassette handling and sequencing system which facilitates the handling of a far greater number of cassettes than prior art systems yet provides ease of operation. By providing a separate relatively small loading section to which cassettes are provided in the storage library, cassettes can be handled rapidly and efficiently and access to all of the storage locations in the library is unnecessary. The unique control system results in efficient operation and in addition enables important information regarding each cassette to be updated as the cassettes are played.

What is claimed is:

1. A tape cassette handling and sequencing system comprising:
   a cassette storage library having a plurality of stationary storage bins, a cassette loading section for receiving cassettes to be stored in the storage bins and a cassette unloading section for receiving cassettes to be removed from the library;
   a plurality of tape transports for playing cassettes stored in the library;
   cassette manipulator means for selectively moving cassettes between the loading section, unloading section, storage bins and tape transports;
   code reading means for reading an identification code located on each cassette; and
   control means for (a) causing the code reading means to read the code on each cassette when the cassette is placed in the loading section to enable the control means to identify the cassette, (b) causing the manipulator means to move cassettes from the loading section to available storage bins and subsequently moving cassettes from the storage bins to the tape transports and then back to the storage bins or unloading section, and (c) controlling the operation of the tape transports to play cassettes therein in a desired sequence.

2. A tape cassette handling and sequencing system as in claim 1 wherein the storage bins, loading section, unloading section and tape transports are located in a columnar and generally circular configuration surrounding the manipulator means.

3. A tape cassette handling and sequencing system as in claim 2 wherein the manipulator means includes a central vertical shaft and a cassette grasping mechanism supported with respect to the shaft and movable vertically along the shaft and rotationally about the shaft to position the grasping mechanism adjacent a desired cassette pick-up or drop-off location.

4. A tape cassette handling and sequencing system as in claim 3 wherein the manipulator means includes a plurality of cassette grasping mechanisms located in a common horizontal plane and wherein the cassette grasping mechanisms move together vertically along the shaft and rotationally about the shaft.

5. A tape cassette handling and sequencing system as in claim 4 wherein the angular columnar spacing of the storage bins, loading section, unloading section and tape transports is an integral multiple of the angular spacing between cassette grasping mechanisms, thereby facilitating sumultaneous grasping or release of cassettes from different columns in a common horizontal plane.

6. A tape cassette handling and sequencing system as in claim 4 wherein the control means (a) causes a first cassette grasping mechanism to remove the cassette from the desired location; (b) without storing the removed cassette, immediately rotates the manipulator means to position a second grasping mechanism holding a replacement cassette to the same location; and (c) causes the second grasping mechanism to deposit the replacement cassette to the location, thereby facilitating replacement of a cassette at a desired location.

7. A tape cassette handling and sequencing system as in claim 1 wherein each storage bin is comprised of a shelf which is tilted downward from a front opening.

8. A tape cassette handling and sequencing system as in claim 1 wherein cassettes are provided to the system from a master library, wherein the control means includes storage means storing alterable data corresponding to each cassette of the master library, wherein the data is automatically altered as the cassette is used.

9. A tape cassette handling and sequencing system as in claim 8 wherein said data includes the number of plays of each cassette.

10. A tape cassette handling and sequencing system as in claim 8 wherein said data includes data indicating when each cassette was last used.

11. An automated tape ccassette handling and sequencing system comprising:
   a cassette storage library having a plurality of columns of storage bins arranged about and opening into a central space, the library including at least one exterior access opening exposing an access portion of the storage bins for loading cassettes into and removing cassettes from the storage library;
   sensor means for detecting when a cassette is inserted into a bin through the access opening;

a plurality of tape transports adjacent the storage bins and facing the central space;

cassette manipulator means disposed within the central space for selectively moving cassettes between the access portion of the storage bins to the remaining storage bins and between the storage bins and the tape transports;

bar code reading means for reading a bar code on each cassette; and control means for (a) causing the manipulator means to move cassettes from the access portion of the storage bins to remaining storage bins in response to detection by the sensor means, (b) causing the bar code reading means to read the code on each cassette when the cassette is inserted into the library and tracking the location of each cassette in the library, (c) causing the manipulator means to move cassettes from the storage bins to the transports in a desired order, (d) causing the transports to play cassettes in the desired order, and (e) causing the manipulator means to return cassettes from the transport to the storage bins after they have been played.

* * * * *

US004654727B1

REEXAMINATION CERTIFICATE (3980th)

United States Patent [19]
Blum et al.

[11] B1 4,654,727
[45] Certificate Issued  Jan. 25, 2000

[54] VIDEOCASSETTE HANDLING AND SEQUENCING SYSTEM

[75] Inventors: Victor Blum; Timothy L. Crabtree, both of Anaheim; Robert G. Fairchild, Santa Ana, all of Calif.

[73] Assignee: Odetics, Inc., Anaheim, Calif.

Reexamination Request:
No. 90/003,583, Sep. 29, 1994

Reexamination Certificate for:
Patent No.: 4,654,727
Issued: Mar. 31, 1987
Appl. No.: 06/720,591
Filed: Apr. 8, 1985

[51] Int. Cl.[7] .................................................. G11B 15/68
[52] U.S. Cl. ............................................................ 360/71
[58] Field of Search ......................................... 360/71, 92

[56] References Cited

U.S. PATENT DOCUMENTS

| | | | |
|---|---|---|---|
| 3,302,804 | 2/1967 | Harris | 214/16.4 |
| 3,504,808 | 4/1970 | Carabateas | 214/16.4 |
| 3,880,320 | 4/1975 | Morello et al. | 221/9 |
| 3,885,217 | 5/1975 | Cintron | 375/42 |
| 3,964,577 | 6/1976 | Bengtsson | 186/1 |
| 4,111,282 | 9/1978 | Vayda, Jr. | 186/1 |
| 4,225,278 | 9/1980 | Weiner | 414/273 |
| 4,247,876 | 1/1981 | Bolick, Jr. | 360/92 |
| 4,251,177 | 2/1981 | Neuhaeusser et al. | 414/276 |
| 4,458,802 | 7/1984 | Maciver et al. | 194/4 |
| 4,519,522 | 5/1985 | McElwee | 221/13 |
| 4,693,373 | 9/1987 | Lamb et al. | 209/3.3 |
| 4,695,215 | 9/1987 | Jacoby et al. | 414/225 |
| 4,757,355 | 7/1988 | Iizuka et al. | 355/75 |

*Primary Examiner*—Aristotelis M. Psitos

[57] ABSTRACT

A tape cassette handling and sequencing system includes a large storage library having a plurality of storage bins and a cassette loading section for receiving cassettes to be stored in the storage bins. Tape transports are provided for playing cassettes stored in the library. A manipulator assembly moves cassettes between the loading section, storage bins and tape transports. The design facilitates the automatic sequencing of a large number of cassettes thus freeing an operator for other tasks.

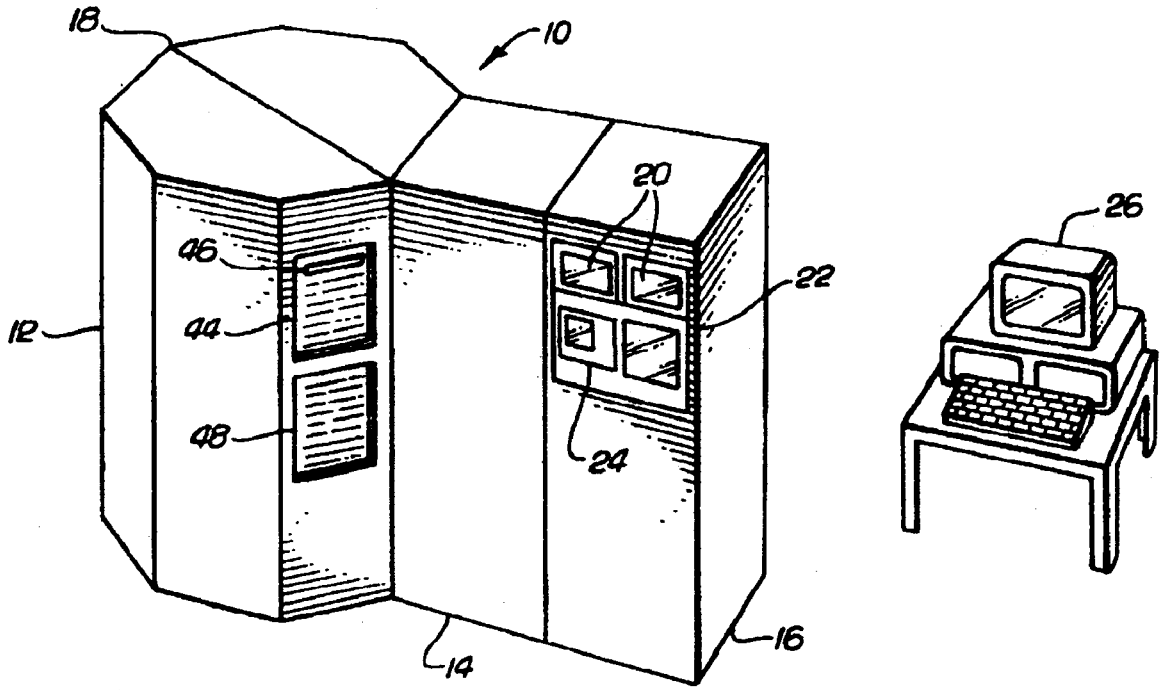

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

* * * * *